US008656078B2

(12) United States Patent
Lim

(10) Patent No.: US 8,656,078 B2
(45) Date of Patent: Feb. 18, 2014

(54) TRANSACTION IDENTIFIER EXPANSION CIRCUITRY AND METHOD OF OPERATION OF SUCH CIRCUITRY

(75) Inventor: Seow Chuan Lim, Letchworth Garden City (GB)

(73) Assignee: ARM Limited, Cambridge (GB)

( * ) Notice: Subject to any disclaimer, the term of this patent is extended or adjusted under 35 U.S.C. 154(b) by 253 days.

(21) Appl. No.: 13/067,107

(22) Filed: May 9, 2011

(65) Prior Publication Data

US 2012/0290752 A1 Nov. 15, 2012

(51) Int. Cl.
*G06F 13/00* (2006.01)
(52) U.S. Cl.
USPC .......................... 710/110; 710/112; 710/310
(58) Field of Classification Search
USPC .......................................... 710/110, 112, 310
See application file for complete search history.

(56) References Cited

U.S. PATENT DOCUMENTS

| 7,181,556 | B2 | 2/2007 | Gwilt | |
|---|---|---|---|---|
| 7,219,178 | B2 | 5/2007 | Harris et al. | |
| 7,558,895 | B2 | 7/2009 | Bruce | |
| 2003/0120874 | A1* | 6/2003 | Deshpande et al. | 711/141 |
| 2005/0138252 | A1* | 6/2005 | Gwilt | 710/110 |
| 2006/0061689 | A1* | 3/2006 | Chen et al. | 348/607 |
| 2006/0075169 | A1* | 4/2006 | Harris et al. | 710/110 |
| 2008/0040523 | A1* | 2/2008 | Bruce | 710/110 |
| 2012/0079150 | A1* | 3/2012 | Aoki et al. | 710/110 |

\* cited by examiner

*Primary Examiner* — Nimesh G Patel
(74) *Attorney, Agent, or Firm* — Nixon & Vanderhye P.C.

(57) ABSTRACT

Transaction identifier expansion circuitry is provided, along with a method of operating such circuitry. The transaction identifier expansion circuitry interfaces between a master device and interconnect circuitry used to couple the master device with a plurality of slave devices to enable transactions to be performed. Transaction analysis circuitry is responsive to each transaction in a sequence of transactions initiated by the master device, to compare at least one attribute of the transaction with predetermined attributes indicative of the target slave device for that transaction. Based on the comparison, an initial transaction identifier is then mapped to one of a plurality of revised transaction identifiers, such that the revised transaction identifier is dependent on the target slave device. Reordering circuitry is then arranged to buffer response transfers received from the interconnect circuitry destined for the master device, with each response transfer having the revised transaction identifier associated therewith. The reordering circuitry then re-orders the response transfers having regard to the original transaction order of those transactions within the sequence of transactions that had the same initial transaction identifier, prior to provision of each response transfer to the master device. By such an approach, the performance of a high performance master device can be maintained, by ensuring that for at least the transactions targeted to a particular subset of the slave devices, no intervention by deadlock avoidance circuitry within the interconnect is required when routing transactions to those slave devices, due to the use of different transaction identifiers when accessing those slave devices.

14 Claims, 8 Drawing Sheets

| INITIAL ID | PAGE ACCESSED | REVISED ID |
|---|---|---|
| 0 | EVEN | 0 |
| 1 | EVEN | 1 |
| 2 | EVEN | 2 |
| 3 | EVEN | 3 |
| 0 | ODD | 4 |
| 1 | ODD | 5 |
| 2 | ODD | 6 |
| 3 | ODD | 7 |

FIG. 6

TRANSACTION IDENTIFIER EXPANSION CIRCUITRY AND METHOD OF OPERATION OF SUCH CIRCUITRY

FIELD OF THE INVENTION

The present invention relates to the handling of transactions between master and slave devices coupled via interconnect circuitry.

DESCRIPTION OF THE PRIOR ART

Within a data processing apparatus having a plurality of master devices and slave devices, it is known to provide interconnect circuitry for coupling the master devices and the slave devices to enable transactions to be performed. Each transaction consists of an address transfer from a master device to a slave device, and one or more data transfers between that master device and that slave device. For a write transaction these data transfers will pass from the master device to the slave device (in some implementations there will additionally be a write response transfer from the slave device to the master device), whilst for a read transaction these data transfers will pass from the slave device to the master device. Any transfers from a slave device to a master device are referred to herein as response transfers.

The interconnect circuitry will provide a plurality of connection paths for coupling the various master devices and slave devices. The way in which the various transfers are routed via those connection paths will be dependent on the bus protocol employed within the interconnect circuitry. One known type of bus protocol is the split transaction protocol. In accordance with such a split transaction protocol, the plurality of connection paths within the interconnect circuitry provide at least one address channel for carrying address transfers and at least one data channel for carrying data transfers. An example of such a split transaction protocol is the AXI (Advanced eXtensible Interface) protocol developed by ARM Limited, Cambridge, United Kingdom. The AXI protocol provides a number of channels over which information and data can be transferred, these channels comprising a read address channel for carrying address transfers of read transactions, a write address channel for carrying address transfers of write transactions, a write data channel for carrying data transfers of write transactions, a read data channel for carrying data transfers of read transactions, and a write response channel for returning transaction status information to the master device at the end of a write transaction, such transaction status information indicating for example whether the transaction completed successfully, or whether an error occurred, etc. Use of such a split transaction protocol can increase the performance of a system compared with a similar system using a non-split transaction protocol.

It is known to associate transaction identifiers with each transaction, as for example described in commonly-owned U.S. Pat. No. 7,181,556, the entire contents of which are hereby incorporated by reference. In accordance with the split transaction protocol, transactions having the same transaction identifier must be handled in order, but where the transaction identifiers are different transactions can be reordered with the aim of improving performance. Hence, as an example, a slave device can then perform some local reordering of pending transactions it has to service based on the transaction identifier information.

However, whilst the ability to reorder transactions can improve performance, it can give rise to a potential cyclic dependency deadlock occurring within the interconnect circuitry, for example where multiple transactions with the same transaction identifier are issued to different slave devices. The possibilities for deadlock become more likely when multiple of the slave devices have the capability to reorder transactions. When deadlock occurs, it is often very difficult to restore the interconnect circuitry to a normal operating state. Therefore, when deadlock occurs it is generally required that the configuration of the interconnect be reset, which will also typically impact the operation of devices coupled thereto. Hence, these devices may also need to be reset to enable the required data transfers to be performed or completed. Accordingly, it will be appreciated that deadlock can have a devastating impact on the performance of a data processing apparatus.

A number of deadlock avoidance schemes have been developed which seek to reduce or remove the likelihood of a deadlock occurring. One such scheme is referred to as a "single slave" scheme, which is a scheme adopted at each master device. In accordance with this scheme, a master device can issue as many pending transactions as it desires to an individual slave device, and these transactions can have the same or different transaction identifiers. However, for any particular transaction identifier, the master device is only allowed to have transactions with that transaction identifier pending with one slave device at a time. Only when those transactions have been completed can the transaction identifier be reused in connection with transactions issued to a different slave device. Accordingly, by this approach, the situation is avoided where two transactions having the same transaction identifier are issued to multiple slave devices at the same time.

In accordance with an alternative scheme, referred to as a "unique ID" scheme, each master device is constrained to always use different identifiers for transactions issued to different slave devices, again this preventing this situation where multiple transactions with the same identifier are pending with different slave devices.

In accordance with a third type of scheme, referred to as a "cyclic order" scheme, an arbitrary order is assigned to the plurality of slave devices coupled to the interconnect circuitry. Each master device is then constrained to send transactions to the various slave devices in that predefined arbitrary order. Hence, by way of example, if the predefined order was slave zero, slave two, slave one, then each master device can issue an arbitrary number of transactions to slave zero, followed by an arbitrary number of transactions to slave two, followed by an arbitrary number of transactions to slave one. Thereafter, all pending transactions have to be completed before that master device can then again start sending transactions to slave zero.

Whilst all of these techniques are effective at reducing or removing the risk of deadlock occurring, they all place significant constraints on how each master device can behave.

Commonly owned U.S. Pat. No. 7,219,178, the entire contents of which are hereby incorporated by reference, describes providing the interconnect circuitry with deadlock prediction circuitry which, at the time each address transfer is issued by a master device, seeks to determine whether propagation of that address transfer may cause the interconnect circuitry to become deadlocked, and if so to prevent the propagation of that address transfer. The prediction circuitry can take regard of deadlock avoidance schemes such as those mentioned earlier when deciding whether any particular address transfer is safe or instead may cause deadlock problems. Again, this scheme restricts the flexibility of the master devices when issuing transactions, since certain address transfers will be prevented from being propagated if the prediction circuitry predicts that a deadlock may arise. Further, such a scheme is relatively complex in that it requires the provision of such prediction circuitry.

Commonly owned U.S. Pat. No. 7,558,895, the entire contents of which are hereby incorporated by reference, describes a technique whereby aliasing circuitry is associated with slave devices to convert certain transaction identifiers to a single specific transaction identifier before passing transactions on to the slave device, thereby removing the ability of the slave device to reorder those transactions. By preventing reordering at the slave device, certain deadlock problems can hence be avoided. However, such an approach can give rise to performance issues, since the ability of the slave device to reorder transactions to improve performance is thwarted by this mechanism.

Considering the issue of performance, one way to improve performance of the interconnect whilst also avoiding the deadlock problem is to ensure that all outstanding transactions over the interconnect all use different transaction identifiers. However, this is extremely complex to manage and requires a lot of buffering in order to enable the required reordering. Also it may be impractical, for example due to the engineering resource required, to deeply modify certain master devices that are not already capable of using unique identifiers. Further, if a master device is supplied by a third party, licensing terms may prevent the modifications that may be required to the master device.

In a system that does not have the capability to ensure that all outstanding transactions all use different transaction identifiers, a problem that arises is how to avoid impacting performance for a high performance master device which is seeking to issue overlapped transactions. In particular, these transactions may be issued to two different slave devices with the same transaction identifier, for example because the master device does not have the capability to allocate different transaction identifiers to those transactions, or because it is unaware that the transactions will actually be serviced by different slave devices. In such cases, implementation of the earlier deadlock avoidance schemes will prevent those transactions from being processed in an overlapped manner, thereby impacting performance.

Accordingly it would be desirable to provide a technique for improving performance whilst still ensuring deadlocks are avoided, but without requiring all outstanding transactions from the master device to use different transaction identifiers.

SUMMARY OF THE INVENTION

Viewed from a first aspect, the present invention provides transaction identifier expansion circuitry for interfacing between a master device and interconnect circuitry used to couple said master device with a plurality of slave devices to enable transactions to be performed, each transaction comprising an address transfer from said master device to a target slave device within said plurality of slave devices, and one or more data transfers between said master device and said target slave device, at least one data transfer being a response transfer from said target slave device to said master device, each transaction having a transaction identifier associated therewith and the interconnect circuitry handling in order transactions having the same transaction identifier, the master device being configured to initiate a sequence of transactions and the transaction identifier expansion circuitry comprising: transaction analysis circuitry, responsive to each transaction in said sequence, to compare at least one attribute of the transaction with predetermined attributes indicative of the target slave device for said transaction, and to map an initial transaction identifier for the transaction to one of a plurality of revised transaction identifiers dependent on the comparison, such that the revised transaction identifier is dependent on the target slave device; and reordering circuitry having buffer circuitry for buffering response transfers received from the interconnect circuitry destined for said master device, each response transfer having the revised transaction identifier associated therewith, the reordering circuitry being configured to reorder the response transfers having regard to the original transaction order of those transactions within said sequence of transactions that had the same initial transaction identifier, prior to provision of each response transfer to said master device.

In accordance with the present invention, for each transaction issued by the associated master device, transaction identifier expansion circuitry compares at least one attribute of the transaction with predetermined attributes indicative of the target slave device for the transaction. An initial transaction identifier provided for the transaction is then mapped to one of a plurality of revised transaction identifiers dependent on the comparison. As a result, if two transactions are issued by the master device with the same initial transaction identifier, but in fact will be serviced by two different slave devices, the transaction identifier expansion circuitry can be arranged to map that initial transaction identifier to a first revised transaction identifier for the first transaction, and to a second, different, revised transaction identifier for the second transaction. As a result, any deadlock avoidance functionality provided within the interconnect will allow the two transactions to proceed without halting propagation of the second transaction to the target slave device until the first transaction has been completed. In particular, since the transactions will then have two different transaction identifiers, no deadlock avoidance intervention is required. Hence, no impact on performance occurs due to the need to manage deadlock avoidance.

In addition to mapping the initial transaction identifiers as outlined above, the transaction identifier expansion circuitry also includes re-ordering circuitry for buffering the response transfers received from the interconnect circuitry, and for re-ordering those response transfers prior to provision to the associated master device. In particular, for any transactions that were issued having the same initial transaction identifier, the re-ordering circuitry will ensure that the response transfers of those transactions are returned to the master device in the original transaction order.

As a result of the above approach, it can be seen that there is no need to modify the behaviour of the master device, since the actions performed by the transaction identifier expansion circuitry are entirely transparent to the associated master device. Furthermore, by mapping initial transaction identifiers to revised transaction identifiers having regard to the target slave device for the transactions, it can be ensured that there is no requirement for deadlock avoidance schemes to intervene in the handling of those pending transactions, hence avoiding any impact on performance that would otherwise adversely affect a high performance master device. Furthermore, since the initial transaction identifier is mapped to one of a plurality of revised transaction identifiers having regard to the target slave device, there is no requirement for every pending transaction to have a different transaction identifier, thus significantly reducing the complexity relative to an equivalent system that ensured that all outstanding transactions all used different transaction identifiers.

The at least one attribute of the transaction that is compared with predetermined attributes indicative of the target slave device can take a variety of forms. However, in one embodiment, said at least one attribute comprises an address specified by the address transfer of the transaction. The full address, or even just a portion of it, can itself provide an indication of the slave device to which the transaction is destined. In particular, different regions of memory may be serviced by different slave devices, and accordingly by comparing the address with those various regions, it can be determined which revised transaction identifier to map the initial transaction identifier to.

In one embodiment, at least two slave devices from said plurality of slave devices are memory devices, each memory device providing a plurality of pages of memory, and the transaction analysis circuitry is configured to compare the address with predetermined page attributes, and to map the initial transaction identifier to one of the plurality of revised transaction identifiers dependent on the comparison. Thus, for transactions within the sequence that have the same initial transaction identifier but access different ones of said at least two slave devices, the transaction analysis circuitry will map the initial transaction identifier to different revised transaction identifiers. Hence, in such embodiments, by ascertaining from the address which page of memory is being accessed, and with the knowledge of how those pages map to particular memory devices, the transaction identifier expansion circuitry can determine how to map the initial transaction identifier to one of the revised transaction identifiers.

In one particular embodiment, a first of said memory devices provides a plurality of even pages of memory and a second of said memory devices provides a plurality of odd pages of memory, and the transaction analysis circuitry is configured to determine from said address whether one of said even pages or one of said odd pages is being accessed by the transaction, thereby causing the revised transaction identifier allocated when the first of said memory devices is the target slave device to be different to the revised transaction identifier allocated when the second of said memory devices is the target slave device.

Hence, in such embodiments, the mapping between the initial transaction identifier and the revised transaction identifier will differ depending on whether an even page of memory is being accessed or an odd page of memory is being accessed. Considering modern data processing systems, such an approach can be useful, since in order to provide higher memory bandwidth and also maintain or improve data access rate efficiency, integrated circuits are increasingly using memory systems that utilise two narrower bandwidth memory devices rather than a single, wider bandwidth, memory device. Such memory devices are often striped to even out the bandwidth between the two memory devices. For example, one memory device may map all odd 4K regions of memory whilst the other device may map all even 4K memory regions. However, often the use of such multiple memory devices is entirely transparent to the master device, and hence the master device may issue multiple overlapped transactions to memory with the same transaction ID, unaware that individual of those transactions will be handled by different master devices. Without the use of embodiments of the present invention, deadlock avoidance schemes within the interconnect would typically detect the potential deadlock problem of two transactions with the same transaction identifier being sent to two different master devices, and would stall the handling of the subsequent transaction until the former transaction has completed, thus significantly impacting performance for the master device issuing the transactions.

However, through use of the above described embodiment, such transactions will have their transaction identifiers modified so that transactions to the different memory devices have different transaction identifiers, thereby avoiding any intervention by the deadlock avoidance schemes since such transactions will not give rise to a potential deadlock scenario. The transaction identifier expansion circuitry then re-orders the response transfers as required before returning them to the master device.

Often, there will be a number of different types of devices which can be accessed via transactions. In particular, in addition to the earlier mentioned memory devices, there can be other devices, such as peripheral devices, where for example the transactions specify addresses which map to particular peripheral registers within the peripheral devices. In one embodiment, when seeking to modify the transaction identifier having regard to the page being accessed, this may ensure that a separate transaction identifier is used for each memory device, but those separate transaction identifiers may not be unique to the memory devices, in that they may also be used in connection with an access to a peripheral device. For example, if we consider a system where a master device issues all transactions with the same transaction identifier, and these may be serviced by a first memory device, a second memory device or a peripheral device, the remapping scheme of embodiments of the present invention can ensure that different transaction identifiers are used when accessing the first memory device and the second memory device. However, any of those different transaction identifiers may also be used when accessing the peripheral device. In such cases, it will be seen that the deadlock avoidance schemes will never need to intervene for accesses to the memory devices, but may need to intervene when an access to a memory device and an access to a peripheral device are overlapped, if those two accesses share the same revised transaction identifier.

In many practical embodiments, this may not be a significant performance problem, since the occurrence of an access to the memory device along with an overlapped access to the peripheral device may occur very infrequently. However, if desired, the transaction identifier expansion circuitry can be arranged to ensure that any revised transaction identifier specified for the peripheral device is different to the transaction identifiers used for the memory devices. In particular, in one embodiment, the transaction and analysis circuitry is configured to determine whether any of said at least two slave devices is the target slave device for the transaction, and if not is configured to map the initial transaction identifier to a revised transaction identifier not used when any of said at least two slave devices is the target slave device.

In one embodiment, said at least two of the slave devices are SDRAM memory devices. As will be understood by those skilled in the art, within such SDRAM memory devices, it is possible to maintain a number of open pages, and a burst access arriving at a SDRAM device may result in the need to close one page and open a new page in memory, such a process incurring a significant time overhead. Accordingly it is more efficient when accessing such a SDRAM device to ensure that longer bursts are performed to reduce the average proportion of the time wasted on the overhead of opening new pages. Thus, by replacing a single SDRAM memory device with two narrower bandwidth SDRAM memory devices, efficiency is improved since longer bursts are needed to service each access at each SDRAM, and there are double the number of open pages. In addition, by using the above described techniques of embodiments of the present invention, the transaction identifiers specified by the master device can be modified so that all accesses to one SDRAM memory device use a different transaction identifier to all accesses to another SDRAM memory device, hence avoiding the need for deadlock avoidance schemes to intervene in the processing of the transactions, and hence avoiding any adverse effect on performance.

In one particular embodiment, first and second SDRAM memory devices are provided which are configured in a striped arrangement so that even pages of memory are provided by the first SDRAM memory device and odd pages of memory are provided by the second SDRAM memory device.

As mentioned previously, through use of the above described embodiments, there is no need to modify the behaviour of the master device. Hence, whilst the master device may be arranged to use different initial transaction identifiers for certain transactions, the technique of the present invention works equally well when the master device is arranged to provide the same initial transaction identifier for all transactions.

There are a number of ways in which the transaction identifier expansion circuitry can be arranged to re-order the response transfers prior to provision of those response transfers to the master device. In one embodiment, the buffer circuitry comprises a plurality of response queues, each response queue being associated with one of said revised transaction identifiers and being arranged to buffer each response transfer received from the interconnect circuitry with that associated revised transaction identifier. The reordering circuitry further comprises an identifier queue to record which revised transaction identifier has been associated with each pending transaction, and is configured to reference the identifier queue in order to determine the order in which the response transfers should be output to said master device from the plurality of response queues. Such an approach provides a particularly simple and effective technique for re-ordering the response transfers, and works particularly well when the number of revised transaction identifiers is relatively small. However, if a large number of revised transaction identifiers are provided (for example because there are a large number of slave devices that the transaction analysis circuitry is seeking to distinguish between, or because the master device uses a large number of initial transaction identifiers), then the various response queues required to support the different revised transaction identifiers can result in a significant area being required to implement the re-ordering circuitry.

However, in such scenarios, the re-ordering circuitry can be arranged in an alternative manner, to replace the various response queues with a tracking table. In particular, in one embodiment, the buffer circuitry comprises a tracking table having a plurality of entries sufficient to provide an entry for each pending transaction, each entry being populated for a pending transaction to identify the revised transaction identifier for that pending transaction and each response transfer of that transaction, the buffer circuitry further maintaining sequencing information identifying a relative ordering between multiple entries relating to pending transactions having the same initial transaction identifier. The reordering circuitry is configured to reference the sequencing information in order to determine the order in which the response transfers should be output to said master device from the tracking table. Hence, in such embodiments, the size of the tracking table is dictated by the number of pending transactions that can be present at any point in time, and not by the number of different revised transaction identifiers that could be used, thereby reducing the area requirement for providing the re-ordering circuitry.

The sequencing information used by the re-ordering circuitry in such embodiments can take a variety of forms. However, in one embodiment the sequencing information is maintained as at least one linked list, a separate linked list being provided for each initial transaction identifier.

As mentioned earlier, said at least one attribute of the transaction that is compared by the transaction analysis circuitry can take a variety of forms. Whilst in one embodiment, that attribute takes the form of an address, in an alternative embodiment, or in addition, the at least one attribute may comprise a memory type identified by the transaction, such memory type information for example identifying whether a memory device or a peripheral device is being accessed.

The interconnect circuitry can be arranged in a variety of ways. However, in one embodiment, the interconnect circuitry comprising a plurality of connection paths configured to provide at least one address channel for carrying said address transfers and at least one data channel for carrying said data transfers. The response transfers that require re-ordering will hence be provided over at least one data channel, and the order in which those response transfers is received is not constrained by the ordering of the corresponding address transfers over the at least one address channel.

Viewed from a second aspect, the present invention provides a data processing apparatus comprising: a plurality of master devices; a plurality of slave devices; interconnect circuitry for coupling said master devices with said slave devices to enable transactions to be performed; and at least one transaction identifier circuitry in accordance with the first aspect of the present invention, each transaction identifier circuitry being configured to interface between an associated one of said plurality of master devices and said interconnect circuitry.

Viewed from a third aspect, the present invention provides a method of operating transaction identifier expansion circuitry to interface between a master device and interconnect circuitry used to couple said master device with a plurality of slave devices to enable transactions to be performed, each transaction comprising an address transfer from said master device to a target slave device within said plurality of slave devices, and one or more data transfers between said master device and said target slave device, at least one data transfer being a response transfer from said target slave device to said master device, each transaction having a transaction identifier associated therewith and the interconnect circuitry handling in order transactions having the same transaction identifier, the master device being configured to initiate a sequence of transactions, and the method comprising: responsive to each transaction in said sequence, comparing at least one attribute of the transaction with predetermined attributes indicative of the target slave device for said transaction; mapping an initial transaction identifier for the transaction to one of a plurality of revised transaction identifiers dependent on the comparison, such that the revised transaction identifier is dependent on the target slave device; buffering response transfers received from the interconnect circuitry destined for said master device, each response transfer having the revised transaction identifier associated therewith; and reordering the response transfers having regard to the original transaction order of those transactions within said sequence of transactions that had the same initial transaction identifier, prior to provision of each response transfer to said master device.

Viewed from a fourth aspect, the present invention provides a transaction identifier expander for interfacing between a master means and interconnect means used to couple said master means with a plurality of slave means to enable transactions to be performed, each transaction comprising an address transfer from said master means to a target slave means within said plurality of slave means, and one or more data transfers between said master means and said target slave means, at least one data transfer being a response transfer from said target slave means to said master means, each transaction having a transaction identifier associated therewith and the interconnect means for handling in order transactions having the same transaction identifier, the master means for initiating a sequence of transactions and the transaction identifier expander comprising: transaction analysis means, responsive to each transaction in said sequence, for comparing at least one attribute of the transaction with predetermined attributes indicative of the target slave means for said transaction, and to map an initial transaction identifier means for the transaction to one of a plurality of revised transaction identifier means dependent on the comparison, such that the revised transaction identifier means is dependent on the target slave means; and reordering means having buffer means for buffering response transfers received from the interconnect means destined for said master means, each response transfer having the revised transaction identifier means associated therewith, the reordering means for reordering the response transfers having regard to the original transaction order of those transactions within said sequence of transactions that had the same initial transaction identifier means, prior to provision of each response transfer to said master means.

BRIEF DESCRIPTION OF THE DRAWINGS

The present invention will be described further, by way of example only, with reference to embodiments thereof as illustrated in the accompanying drawings, in which:

FIG. 6 is a table illustrating how revised transaction identifiers may be produced in one embodiment, where the master device supports multiple initial transaction identifiers;

DESCRIPTION OF EMBODIMENTS

In the embodiments described below, the interconnect circuitry of a data processing apparatus employs a split transaction protocol in which separate address channels and data channels are provided, and the timing of data transfers is decoupled with respect to the timing of address transfers of a particular transaction. In one particular embodiment, the interconnect circuitry operates in accordance with the AXI protocol, and the connection paths of the interconnect circuitry provide five channels, namely a read address channel, a write address channel, a read data channel, a write data channel and a write response channel.

Figure 1:
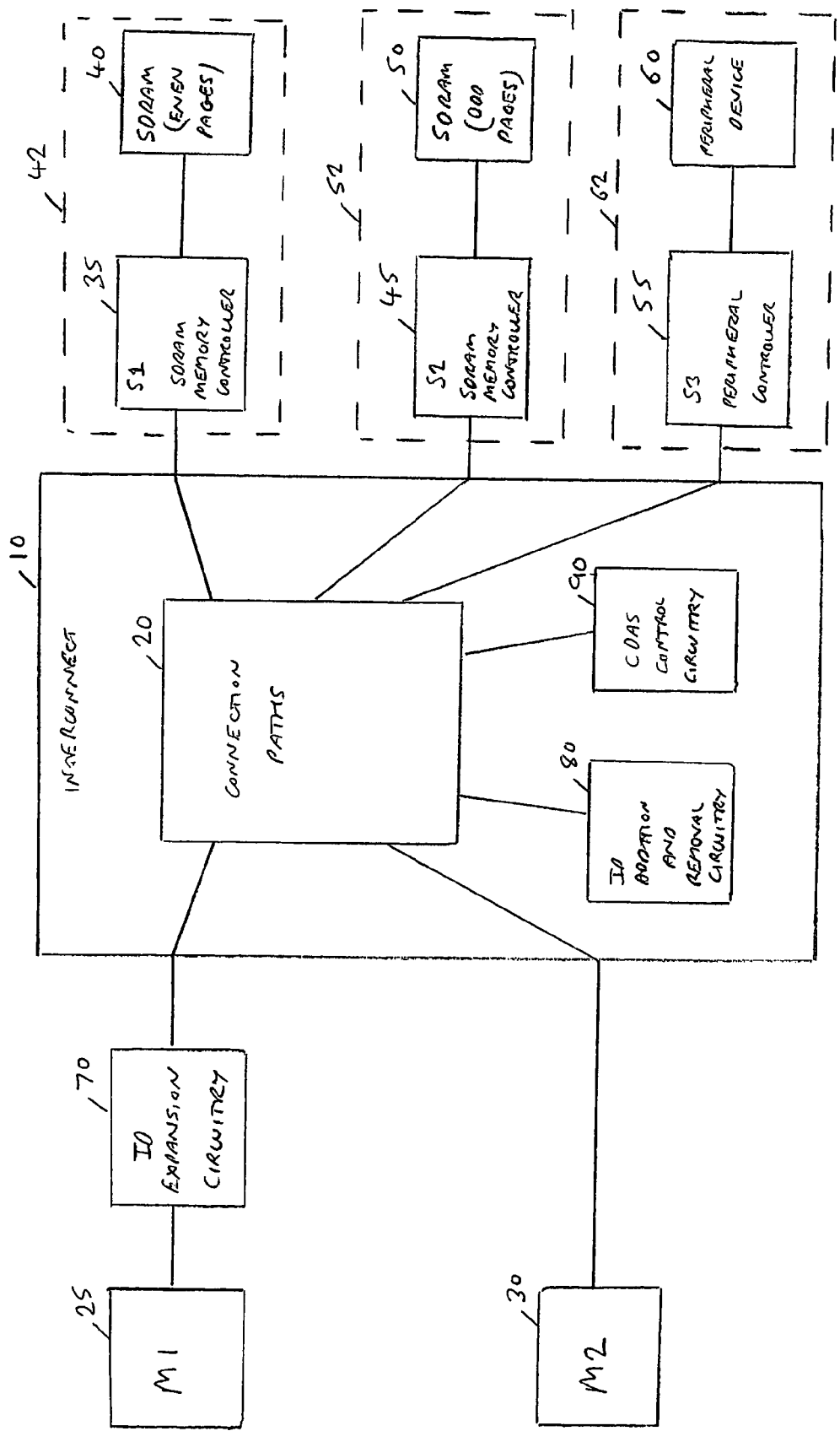
FIG. 1 is a block diagram of a data processing system in accordance with one embodiment.

FIG. 1 is a block diagram of a data processing apparatus incorporating such interconnect circuitry. As shown in FIG. 1, the interconnect circuitry 10 has a number of master devices connected thereto, in this example two master devices M1 25 and M2 30, and also has a number of slave devices connected thereto, in this example the slave devices generally represented by the reference numerals 42, 52, 62. As shown in FIG. 1, the slave devices may actually comprise controller circuitry connected to the interconnect 10, with the controller then being coupled to the ultimate slave device. Hence, in this example two SDRAM memories 40, 50 are coupled to the interconnect 10 via associated SDRAM memory controllers 35, 45, and similarly a peripheral device 60 is coupled via a peripheral controller 55 to the interconnect 10. In some embodiments where the apparatus of FIG. 1 is formed as an integrated circuit, the various controllers 35, 45, 55 may be provided on-chip, whilst the actual memory devices 40, 50 and peripheral device 60 may be provided off-chip. Alternatively, in some embodiments, the memory devices and peripheral devices may also be provided on-chip. For the purposes of the subsequent description, where there is no need to distinguish between the controller and the associated device, reference will be made to the two memory devices 42, 52 and the peripheral device 62.

The interconnect circuitry 10 couples the master devices and the slave devices via a number of connection paths 20 to enable transactions to be performed. Each transaction consists of an address transfer from a master device to a slave device over an address channel, and one or more data transfers between the master device and the slave device over an appropriate data channel. For simplicity, the individual channels are not shown separately in FIG. 1.

When each master device initiates a transaction by issuing an address transfer, that master device will typically issue a transaction identifier with the address transfer to identify the transaction, so that said transaction identifier can then be used in association with the data transfers of the transaction in order to match those data transfers with the address transfer.

Each master device 25, 30 may have one or more transaction identifiers that it uses for transactions, and the transaction identifier(s) used by any particular master device may or may not be different to the one or more transaction identifiers used by any other of the master devices. If a master device does not directly provide a transaction identifier with each transaction, a default transaction identifier, such as a transaction identifier of zero, is assumed by the interconnect circuitry 10, and hence such a master device is analogous to a master device that always uses the same transaction identifier for its transactions.

Within the interconnect circuitry 10, ID addition and removal circuitry 80 is provided to ensure that transactions from different master devices can be uniquely identified within the interconnect circuitry 10. Such ID addition and removal circuitry 80 is arranged, for each transaction identifier issued by the associated master device, to extend that transaction identifier with a master number that allows the routing of responses back to that master device. Similarly, when transfers are routed back to the master device, the ID addition/removal circuitry 80 strips off the master number before the response transfer is returned to the associated master device 25, 30. In addition to allowing the routing of responses back to the appropriate master device, the extension of the transaction identifier with a master number to create a new form of transaction identifier within the interconnect circuitry also has the consequence that any slave device 42, 52, 62 that has the capability to re-order transactions having different transaction identifiers is then able to also re-order transactions from different master devices even if they originally have the same transaction identifier.

By using different transaction identifiers for different transactions, and thereby facilitating re-ordering of transactions, this can lead to performance improvements in the processing of transactions, and can also allow certain transactions to be prioritised over other transactions. However, one potential side effect of such flexibility is that a cyclic dependency deadlock can arise within the interconnect circuitry 10. One particularly problematic case which can give rise to deadlocks is where a single master device issues transactions to two different slave devices with the same transaction identifier. In order to detect such potential deadlock conditions, cyclic dependency avoidance scheme (CDAS) control circuitry 90 is provided within the interconnect 10 to detect sequences of transactions that could cause deadlock if allowed to proceed simultaneously, and to take action to avoid such deadlock occurring. For example, if the CDAS control circuitry 90 detects a first transaction and a second transaction that could give rise to a deadlock if allowed to proceed in parallel, the CDAS control circuitry 90 may stall forwarding the second transaction on to the target slave until the first transaction has been completed, thereby avoiding the possibility of deadlock arising. However, it will be appreciated that whilst such deadlock avoidance control circuitry is an important feature of the interconnect circuitry to ensure correct operation, it can have a significant adverse performance impact on a high performance master device by significantly increasing the time taken to process its transactions.

In the example shown in FIG. 1, it is assumed that the master device 25 is one such high performance master device, and is arranged to issue a sequence of overlapped transactions to SDRAM memory. As will be discussed in more detail with reference to the remaining figures, in accordance with the embodiments described below, ID expansion circuitry 70 is provided between the master device 25 and the interconnect circuitry 10 to analyse one or more attributes of each transaction issued by the master device 25 in order to obtain certain information about the target slave device for each transaction. It then maps the initial transaction identifier specified by the master device 25 to one of a plurality of revised transaction identifiers, so as to ensure that when multiple transactions are issued by the master device 25 to the memory devices 42, 52 with the same initial transaction identifier, a different revised transaction identifier is used when accessing the first memory device 42 to that used when accessing the second memory device 52. This ensures that for the transactions issued to the two memory devices 42, 52, by the master device 25, the CDAS control circuitry 90 does not need to intervene in the handling of those transactions, and hence this avoids any performance impact that such intervention would likely incur. The ID expansion circuitry 70 is then provided within re-ordering circuitry to re-order the response transfers as required prior to returning them to the master device 25, so that for a series of transactions issued by the master device 25 with the same initial transaction identifier, the response transfers of those transactions are returned in order to the master device 25.

As shown in FIG. 1, the two memory devices 42, 52 are both SDRAM memory devices, with any accesses to even pages of the SDRAM being directed to the memory device 42, whilst all accesses to odd pages of the SDRAM are directed to memory device 52. Such an arrangement is known as a striped memory arrangement, and generally provides for a significantly improved efficiency of use of the SDRAM memory when compared with an equivalent single block of SDRAM memory having twice the bandwidth of the individual SDRAM memories 40, 50. In particular, there is a significant overhead incurred each time a new page of SDRAM needs to be accessed, since a new page of memory must first be pre-charged and then subjected to an open command (the so-called RAS command) before any access to that page can take place. However, once a SDRAM page has been opened, a series of accesses to that page can occur sequentially without any further overhead, and accordingly the overall efficiency of a SDRAM increases as the number of accesses to a currently open page increases. Thus, by replacing a single SDRAM memory with two separate SDRAM memories having half the bandwidth, and by accessing those SDRAM memories in parallel, the overall efficiency of the SDRAM can be improved, whilst maintaining a high overall memory bandwidth, since longer bursts are performed thereby reducing the average overhead per access.

However, it will often be the case that the master device issuing transactions to memory will be unaware of the actual structure of the SDRAM memory, and hence will be unaware that there are in fact two separate SDRAMs 40, 50. Accordingly, even if it had the capability to use more than one transaction identifier for its transactions, it may well issue a number of overlapped transactions to both even and odd pages of SDRAM using the same transaction identifier, thus resulting in a transaction from a single master device being directed to multiple target slave devices with the same transaction identifier. Without the use of the ID expansion circuitry 70, the CDAS control circuitry 90 would intercept such accesses and in effect serialise them, thereby significantly reducing performance as viewed from the perspective of the master device 25. However, through use of the ID expansion circuitry 70, this is avoided, as the ID expansion circuitry 70 is arranged to modify the transaction identifier dependent on the target slave being accessed, so as to ensure that accesses to the slave device 42 use different transaction identifiers to accesses to the slave device 52, thereby avoiding the need for the CDAS control circuitry 90 to intervene.

Whilst the interconnect circuitry 10 of FIG. 1 is shown having only two master devices and three slave devices connected thereto, it will be appreciated that in a typical implementation there may well be significantly more master devices and slave devices connected to the interconnect circuitry. Further, whilst the ID expansion circuitry 70 of FIG. 1 is shown only used in connection with the master device 25, separate instantiations of the ID expansion circuitry 70 can be used in association with any number of master devices. Hence, if for example the second master device 30 is also a high performance master device that is likely to issue a sequence of overlapped transactions to SDRAM memory, it can also be provided with its own ID expansion circuitry, which will operate in exactly the same way as the ID expansion circuitry 70 of FIG. 1.

Figure 2:
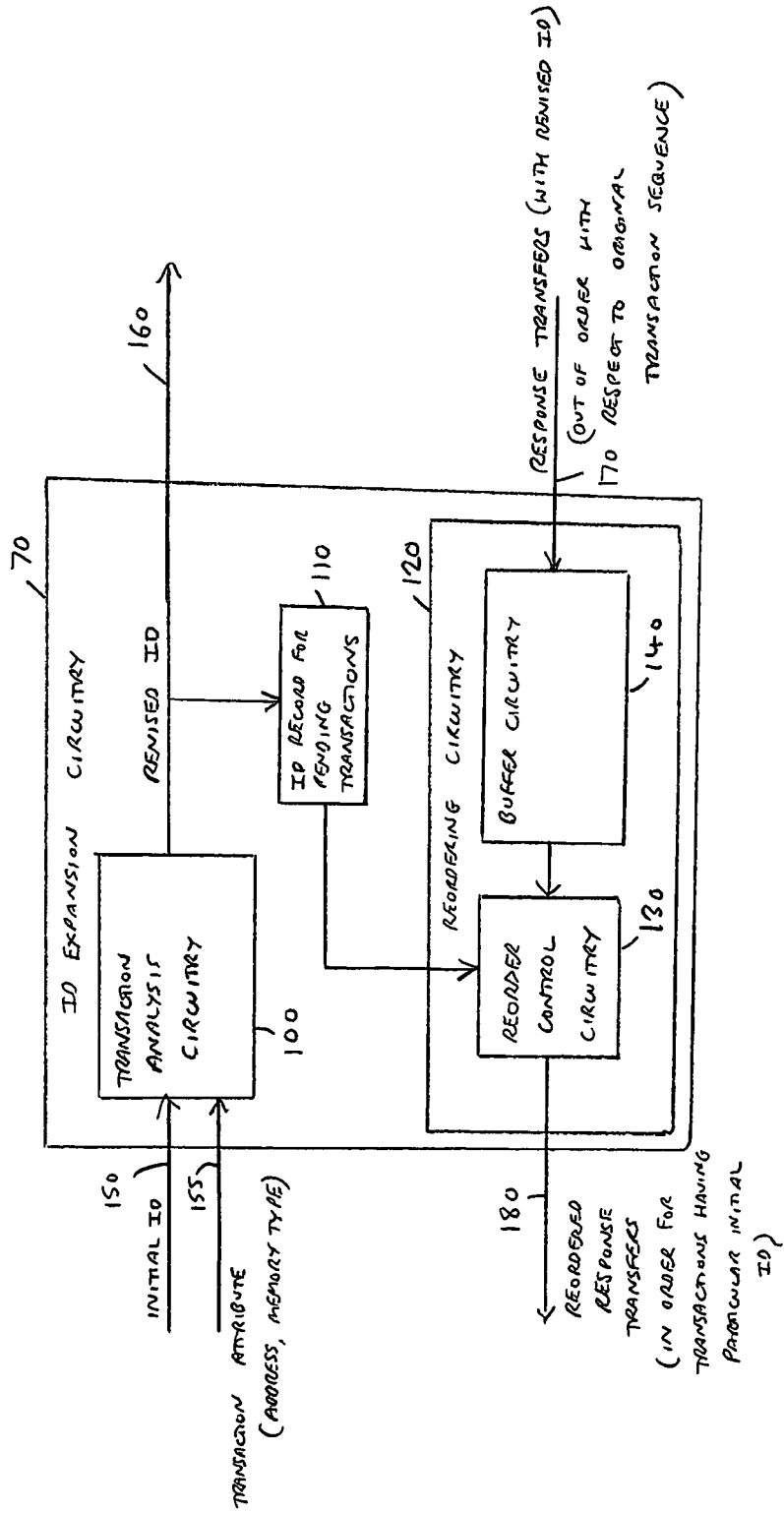
FIG. 2 is a block diagram illustrating in more detail the elements provided within the ID expansion circuitry of FIG. 1 in accordance with one embodiment.

FIG. 2 is a block diagram illustrating in more detail the components provided within the ID expansion circuitry 70 of FIG. 1 in accordance with one embodiment. Transaction analysis circuitry 100 is provided for analysing one or more attributes of each transaction provided over the path 155, and in particular for comparing such attributes with predetermined attributes indicative of the target slave device for the transaction. In one embodiment, the transaction analysis circuitry analyses the address to determine which region of memory it corresponds to, and in one particular embodiment performs such an analysis in order to determine whether an even block of memory or an odd block of memory is being accessed. In one particular embodiment, each block is 4 Kb in size. Based on the comparison, the transaction analysis circuitry 100 then maps an initial ID specified for the transaction (and received over path 150) to a revised ID output over path 160. In particular, for each initial transaction identifier, there will be a plurality of revised transaction identifiers that that initial transaction ID can be mapped to. Considering the example of FIG. 1, in one embodiment each initial transaction ID may be mapped to one of two revised transaction IDs, one revised transaction ID being used for an access to an even page of memory, and the other revised transaction ID being used for an access to an odd page of memory. This ensures that for a transaction issued to one of the SDRAM slave devices 42, 52, the revised transaction ID will vary dependent on which of those two SDRAM devices is being accessed. In one embodiment, the same revised transaction IDs may be used when accessing the peripheral slave device 62, but in an alternative embodiment a separate revised transaction ID may be used for accesses to the peripheral devices, and another transaction attribute such as the memory type attribute may be used to determine whether memory or a peripheral device is being accessed.

As each transaction is analysed by the transaction analysis circuitry 100, and a revised transaction ID is produced for that transaction, an ID record for pending transactions 110 is updated so as to keep a sequence of revised transaction IDs, which can then be used by the re-ordering circuitry 120 when response transfers are received for passing back to the master device.

In particular, each of the response transfers received from the interconnect 10 over path 170 may be out of order with respect to the original transaction sequence, and are buffered in the buffer circuitry 140 along with the indication of the revised transaction ID used for the associated transaction. The ID record 110 is referenced to determine the oldest entry, and in particular the revised transaction ID specified by that oldest entry, with the re-order control circuitry 130 then using that revised transaction ID to determine whether there are currently any entries in the buffer circuitry having that revised transaction ID. If there are, then each response transfer having that revised transaction ID and associated with a single transaction is output over path 180. In embodiments where there may be multiple response transfers associated with a particular transaction (as for example would be the case for a burst read transaction), then the last response transfer of the transaction is typically identified with a "last" control signal, and accordingly the re-order control circuitry 130 will continue to output the response transfers with the particular revised transaction ID until the "last" control signal is observed in association with a particular response transfer, at which point it can be determined that all response transfers of the relevant transaction have been returned. At this point, the entry currently being read from the ID record 110 can be popped so as to remove that entry from the ID record. Thereafter, the next oldest ID record entry is identified, and the process repeated for the revised transaction ID specified by that accessed entry.

In this way, the response transfers of each transaction can be re-ordered prior to output to the master device, thereby ensuring that for a sequence of transactions issued by the master device with the same initial transaction ID, the response transfers of those transactions are returned in order to the master device.

Figure 3:
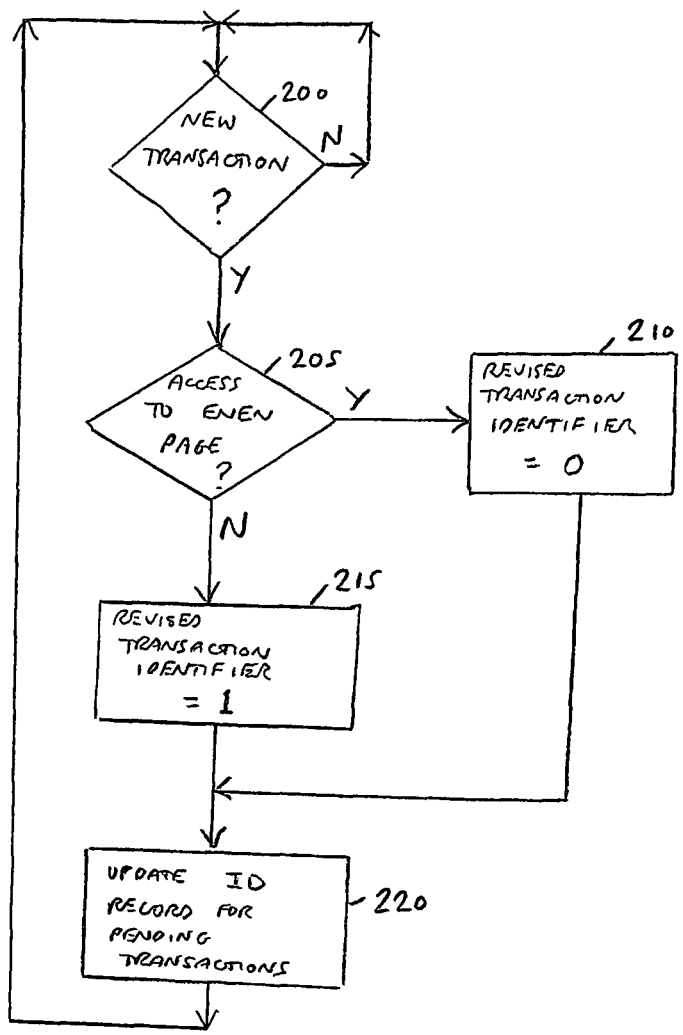
FIG. 3 is a flow diagram illustrating the operation of the transaction analysis circuitry of FIG. 2 in accordance with one embodiment.

FIG. 3 is a flow diagram illustrating the operation of the transaction analysis circuitry 100 of FIG. 2 in accordance with one embodiment. At step 200, it is determined whether there is a new transaction to analyse, and if so the process proceeds to step 205, where the address is analysed in order to determine whether an even page of memory is being accessed. If so, then the revised transaction identifier is set equal to zero at step 210. However, if it is determined that an even page is not being accessed, and hence an odd page is being accessed, then the revised transaction identifier is set equal to one at step 215.

Following either step 210 or step 215, the process proceeds to step 220 where the ID record 110 is updated in order to include an entry for the revised transaction identifier produced at either step 210 or step 215. Thereafter, the process returns to step 200 to await the next transaction.

In this example, it is assumed that all transactions issued by the master device 25 have the same initial transaction identifier. If not, then the process of FIG. 3 can be modified to produce two different variants of each initial transaction identifier. This can be illustrated for example with reference to FIG. 6, where in this example it is assumed that the master device 25 can produce four initial transaction identifiers, namely identifiers 0 to 3. As shown in the table, if an access to an even page is determined at step 205, then the revised transaction identifier is set equal to the initial transaction identifier, whereas if an odd page is being accessed, then an initial transaction identifier of 0 is mapped to a revised transaction identifier of four, an initial transaction identifier of one is mapped to a revised transaction identifier of five, etc.

By such an approach, it will be seen that for every transaction issued by the master device 25 to SDRAM, then a pending transaction to the SDRAM slave device 42 will always have a different transaction identifier to a pending transaction to the SDRAM slave device 52, thereby avoiding any need for the CDAS control circuitry 90 to intervene in those accesses, since no deadlock can occur within the interconnect irrespective of how the two slave devices 42, 52 prioritise the handling of those transactions.

However, when using the approach of FIG. 3, it will also be appreciated that transactions to the peripheral slave device 62 can also have revised transaction IDs of zero or one. In some implementations, this will not be problematic, since for example the master device 25 may only very rarely access the peripheral device 62, with the bulk of the accesses being in respect of the SDRAM memory represented by the two slave devices 42, 52. Accordingly, there may be no significant performance impact if occasionally the master device 25 issues pending transactions to the SDRAM and the peripheral device 60. In such instances, the CDAS control circuitry 90 will ensure that no cyclic dependency deadlock can occur by deferring onward propagation of the later transaction until the earlier transaction has completed.

Figure 4:
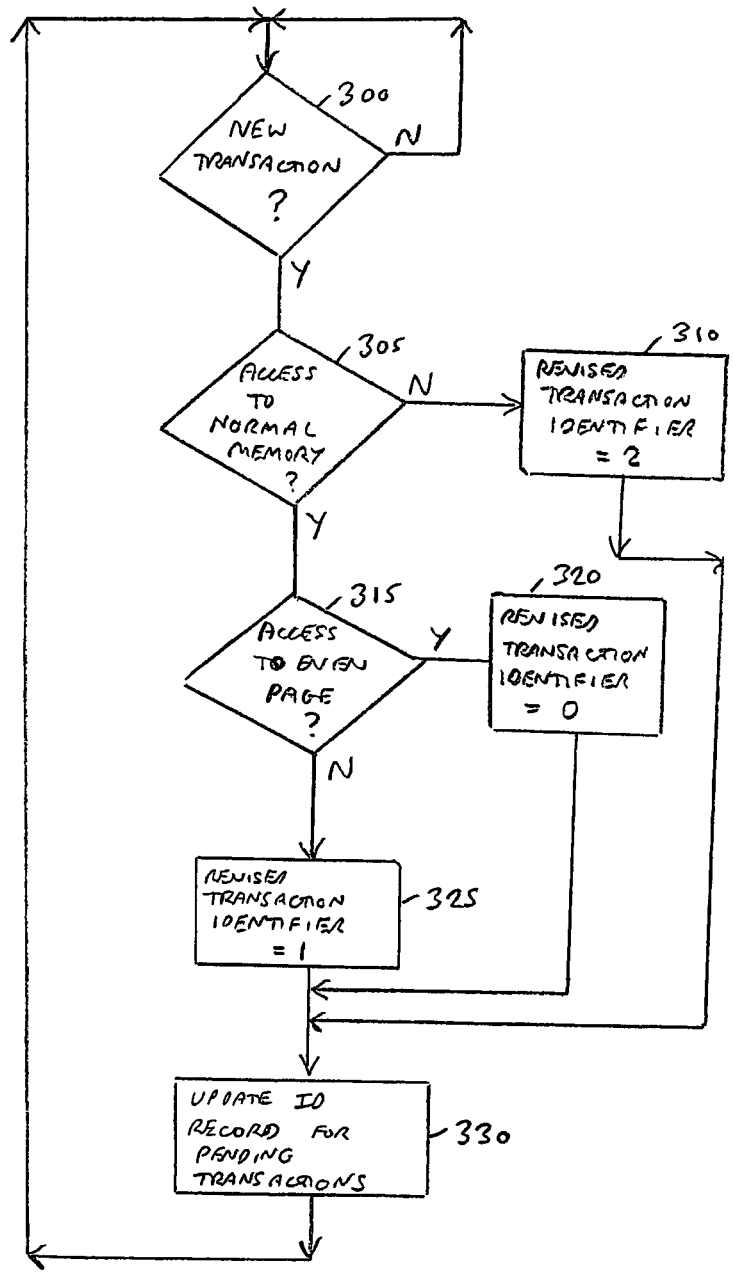
FIG. 4 is a flow diagram illustrating the operation of the transaction analysis circuitry of FIG. 2 in accordance with an alternative embodiment.

However, in embodiments where the use of the same revised transaction identifiers for access to SDRAM and to the peripheral device may be of concern, the alternative embodiment illustrated in FIG. 4 may be used.

As will be apparent from a comparison of FIG. 4 with FIG. 3, steps 300, 315, 320, 325 and 330 correspond to steps 200, 205, 210, 215 and 220 of FIG. 3, and accordingly will not be discussed further herein. However, prior to step 315, the process of FIG. 4 includes the step of determining whether the access is to normal memory at step 305. In particular, in one embodiment the memory space will be divided into normal memory (such as used by the SDRAM devices 40, 50) and peripheral memory (such as used by the peripheral device 60). A memory type attribute specified by the transaction will identify whether normal memory or peripheral device memory is being accessed, and accordingly, with reference to that memory type attribute, it can be determined whether an access to normal memory is taking place. If not, then the process proceeds to step 310, where a revised transaction identifier of two is produced, with the ID record then being updated at step 330. Accordingly, it can be seen that by such an approach, whenever the peripheral slave device 62 is accessed, a revised transaction identifier will be generated that is different to the revised transaction identifiers used for accesses to SDRAM, thereby avoiding any need for the intervention of the CDAS control circuitry 90.

Again, for simplicity, it has been assumed in FIG. 4 that the master device 25 uses the same transaction identifier for every transaction and accordingly only the three revised transaction identifiers illustrated in FIG. 4 are required. However, where multiple initial transaction identifiers are supported, a separate plurality of revised transaction identifiers will be provided for each possible initial transaction identifier, using an analogous approach to that discussed earlier with reference to FIG. 6.

Figure 5:
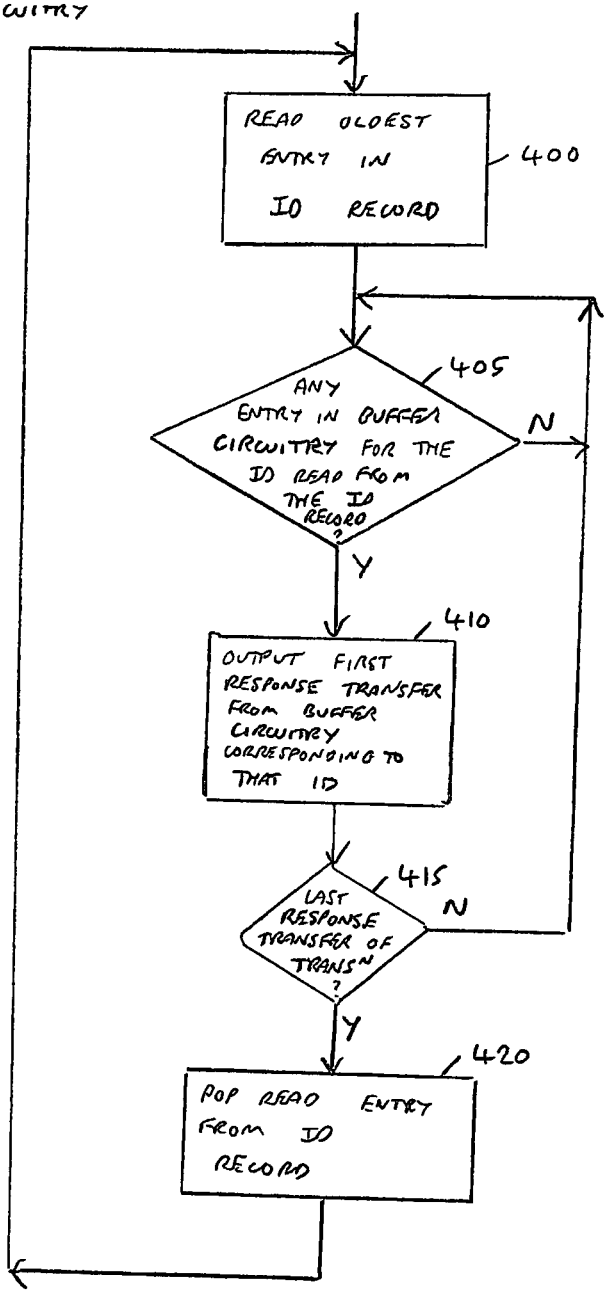
FIG. 5 is a flow diagram illustrating the operation of the re-order control circuitry of FIG. 2 in accordance with one embodiment.

FIG. 5 is a flow diagram illustrating the operation of the re-order control circuitry 130 of FIG. 2 in accordance with one embodiment. At step 400, the oldest entry in the ID record is read, whereafter at step 405 it is determined whether there is any entry in the buffer circuitry 140 for the revised transaction ID that has been read from the ID record at step 400. If not, the process waits at step 405 until the buffer circuitry does include a response transfer having that revised transaction ID.

Once an entry in the buffer circuitry having the relevant revised transaction ID is found, the process proceeds to step 410, where the first response transfer from the buffer circuitry corresponding to that revised transaction ID is output over path 180 to the master device.

As will be discussed in more detail with reference to FIGS. 7 and 8, there are a number of ways in which the buffer circuitry can be arranged. In one embodiment, the buffer circuitry includes a response queue for each revised transaction ID, and in that embodiment the "first" response transfer will be that response transfer at the head of the relevant queue. However, in an alternative embodiment as will be described later with reference to FIG. 8, a tracking table may be used with sequencing information being used to identify relative ordering between multiple entries relating to pending transactions having the same initial transaction identifier. In such embodiments, this sequencing information will be referenced in order to determine "the first" response transfer to be output at step 410.

At step 415, it is determined whether the response transfer output at step 410 was the last response transfer for the transaction. As will be discussed later with reference to FIGS. 7 and 8, for a write transaction there will typically only be a single response transfer, namely the write response transfer providing status information about the write transaction, and accordingly when dealing with write transactions it will typically be determined at step 415 that the last response transfer has been reached. However, for a read transaction, there may be multiple read response transfers within a particular transaction, and typically the last read response transfer will be marked as the last via a relevant control bit. Accordingly, at step 415, it is determined whether that "last" control bit is set. If not, the process returns to step 405, with steps 405, 410 and 415 being repeated until all response transfers of the transaction have been output. Thereafter, at step 420, the entry from the ID record that was read at step 400 is popped from the ID record to remove it for consideration next time the re-order control circuitry performs the process of FIG. 5. Thereafter, the process returns to step 400 to repeat the process again for the now oldest entry in the ID record.

Figure 7:
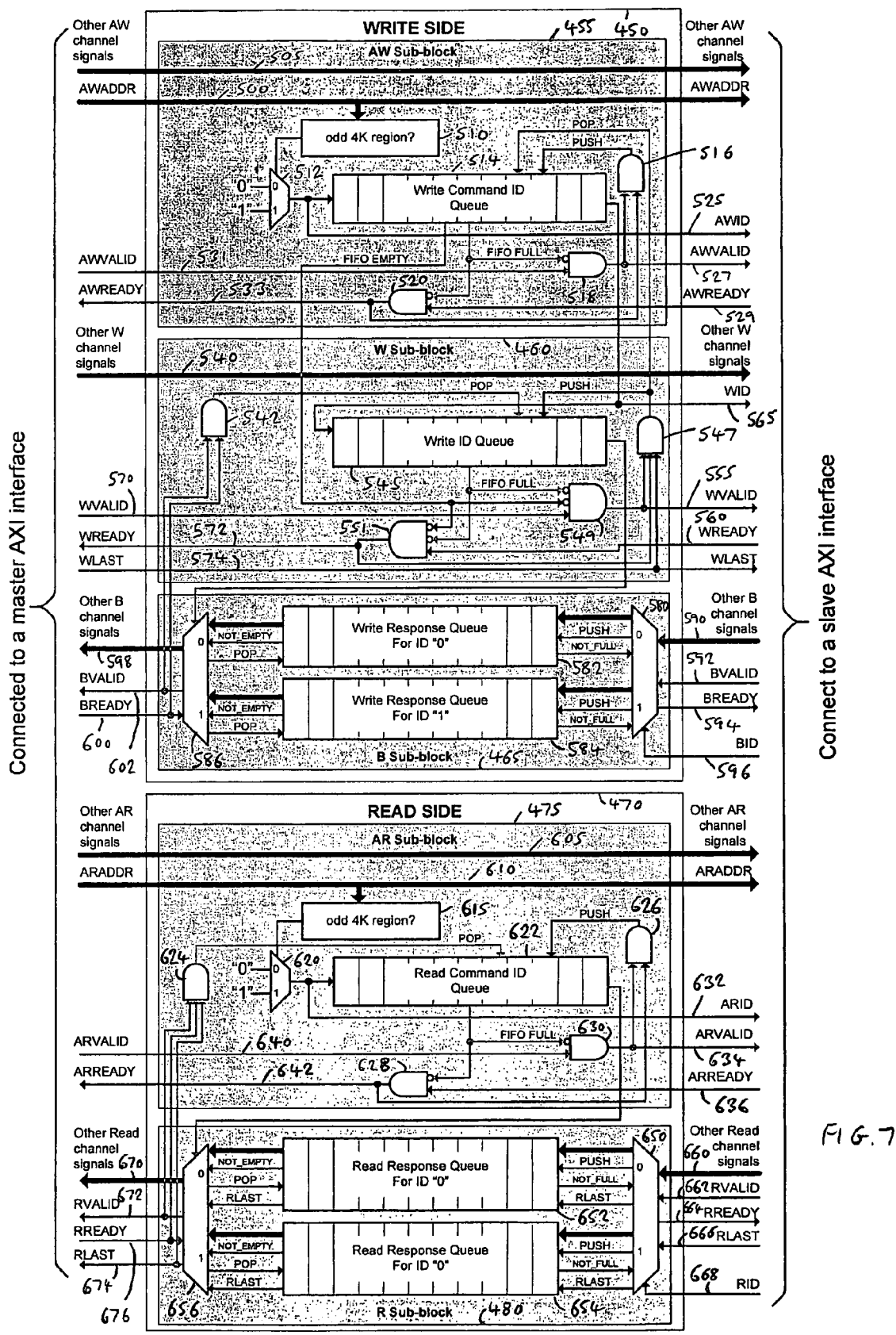
FIG. 7 provides a detailed view of the ID expansion circuitry in accordance with one embodiment.

FIG. 7 is a detailed diagram of the ID expansion circuitry 70 of FIG. 1 in accordance with one embodiment. In this example, it is assumed that the AXI protocol is used, and accordingly there are five channels of communication. The write side module 450 consists of three sub-blocks, one for each of the three channels involved in write transactions, and accordingly there is a write address sub-block 455, a write data sub-block 460 and a write response sub-block 465.

The write address passes over path 500 through the write address sub-block 455, whilst the other write address channel signals pass over path 505. The transaction analysis circuitry 100 of FIG. 2 is implemented by the address analysis circuitry 510 which is used to determine for a current transaction whether that transaction is an access targeting an odd 4K region or an even 4K region of memory, the output of the determination block 510 controlling a multiplexer 512 (which can also be considered to be part of the transaction analysis circuitry 100 of FIG. 2) which generates a revised transaction ID dependent on the determination.

In particular, in this example, it is assumed that each incoming transaction from the master device has a default initial transaction identifier of zero, because the master device is arranged not to specify transaction identifiers. Accordingly, the multiplexer 512 merely selects between a logic zero value and a logic one value for the revised transaction identifier, dependent upon whether an even 4K region or an odd 4K region, respectively, is being accessed.

The output from the multiplexer 512 is provided over path 525 as the revised transaction identifier for the current transaction, and this revised transaction identifier is also loaded into the write command ID queue 514 under the control of the AND gate 516, which in the presence of an asserted valid signal and an asserted ready signal, causes the current revised transaction ID value to be pushed into the write command ID queue.

As will be understood by those skilled in the art, the valid and ready signals form a handshake signal between the master device and the interconnect, with the associated signals (in this case the write address and associated control signals over paths 500, 505) being propagated between the master device and the interconnect in the presence of asserted valid and ready signals.

As shown in FIG. 7, the two AND gates 518, 520 break the propagation of asserted valid and ready signals if the command ID queue 514 is full, hence stalling propagation of a current transaction until the write command ID queue has space to accommodate another ID value.

Considering now the write data sub-block 460, the incoming write data passing over path 540 is assigned the revised transaction ID from the output of the write command ID queue 514, with this revised transaction ID being output over path 565 in association with the write data. As will be understood by those skilled in the art, a write transaction can have a variable burst length, and hence there may be multiple blocks of write data output over path 540 as part of a single write transaction, each block having the same revised transaction ID associated with it over path 565. By using the write command ID queue 514, this allows write transactions to issue the address transfers well ahead of the write data.

The last write data block of a write transaction will have an asserted WLAST signal associated with it over path 574, and this is used as an input to the AND gate 547, along with the valid and ready signals appearing on paths 555 and 572. In the presence of all three of these signals being asserted, this indicates that the last write data block of the write transaction has been successfully propagated to the interconnect, and this causes the AND gate 547 to output a pop signal to the write command ID queue 514 to cause the revised transaction ID value at the head of the write command ID queue 514 to be popped from the write command ID queue 514, and pushed into the write ID queue 545.

In an analogous manner to the AND gates 518, 520 in the write address sub-block 455, the AND gates 549 and 551 cause the valid/ready handshake signals to be interrupted if the write ID queue 545 is full. It should also be noted that these AND gates 545, 551 also cause the valid and ready signals to be interrupted if the write command ID queue 514 is empty.

Considering the write response channel sub-block 465, the returning write responses over path 590 are loaded into one of the two write response queues 582, 584, depending on the revised transaction ID value appearing on path 596. In particular, the multiplexer 580 controls the input of response transfers received over path 590 into the relevant write response queue 582, 584 under the control of the revised transaction ID 596, with each response being pushed into its relevant queue provided the queue is not full. If the queue is full, then the signal on path 590 is stalled until there is space in the relevant queue to accommodate that signal.

The output from the head of the write ID queue 545 is used to control the multiplexer 586, and hence to select which write responses from the two write response queues 582, 584 are propagated back to the master device. Each of the write response queues outputs a NOT_EMPTY signal to the multiplexer 586. If the write response queue 582, 584 selected by the output from the write ID queue 545 is empty, then the BVALID signal asserted over path 602 will be set low. However, if the selected write response queue is not empty, then in the presence of an asserted BREADY signal from the master over path 600, an entry from the selected write response queue 582, 584 will be popped and output over the path 598 to the master device. Also, in that instance, both inputs to the AND gate 542 will be set, and accordingly the entry at the head of the write ID queue 545 will be popped.

The write command ID queue 514 should have its depth set so that it matches the number of write transactions that can be issued ahead of write data associated with those transactions. The write ID queue 545 should have a depth set to match the maximum number of outstanding write accesses that can be issued. Each of the write response queues 582, 584 should be set to have a minimum depth of one less than the maximum number of outstanding write accesses that can be issued, in order to avoid the possibility of a deadlock scenario occurring.

The read side module 470 is divided into a read address sub-block 475 and a read data sub-block 480. The read address sub-block 475 operates in the same way as the write address sub-block 455, and hence the components 615, 620, 622, 626, 628, 630 correspond with the elements 510, 512, 514, 516, 520, 518, respectively. Accordingly, it can be seen that a revised transaction identifier is output over path 632 based on a determination as to whether the read address over path 610 is directed to an odd 4K region or an even 4K region of memory.

The read data sub-block 480 works in a similar way to the write response sub-block 465, and accordingly there is a separate read response queue 652, 654 for each revised transaction ID. Each entry in each read response queue is able to store all of the read data and associated control data of each returning read response. The output of the read command ID queue 622 is used to control the multiplexer 656 in an analogous way to how the output of the write ID queue 545 is used to control the multiplexer 586 in the write side module 450.

As is apparent from a comparison of the read data sub-block 480 with the write response sub-block 465, the read data sub-block also allows propagation of the read last (RLAST) control signal received over path 666 through the relevant read response queue 652, 654 and output via the multiplexer 656 over the path 674. When the last read response for a particular transaction is output over path 670, the RLAST signal appearing over path 674 will be asserted, which in combination with the asserted valid and ready signals on path 672, 676 will cause the output of the AND gate 624 to be set in order to pop an entry from the read command ID queue 622.

The read command ID queue 622 should have a depth set so that it matches the maximum number of outstanding read accesses that can be issued. Each of the read response queues 652, 654 should be set to have a depth equal to a minimum of one less than the maximum number of outstanding read accesses that can be issued, in order to avoid a deadlock scenario from potentially occurring.

From a comparison with FIG. 2, it can be seen that in the implementation of FIG. 7, the transaction analysis circuitry 100 is formed by the components 510, 512 in the write address sub-block 455 and the components 615, 620 in the read address sub-block 475. Similarly, the write command ID queue 514, write ID queue 545 and read command ID queue 622 collectively form the ID record 110 for keeping record of the revised transaction identifiers associated with pending transactions. The two write response queues 582, 584 and the two read response queues 652, 654 form the relevant buffer circuitry 140, with the various multiplexers and AND gates then forming the required re-order control circuitry 130.

It should be noted that the ID expansion circuitry illustrated in FIG. 7 can be readily extended in a number of ways. In particular, instead of the determination circuitry 510, 615 analysing the address to determine whether it matches an even or an odd 4K region, the determination circuitry may analyse different attributes of the transaction, for example a memory type attribute identifying the type of memory being accessed by the transaction, and may vary the revised transaction identifier on the basis of that analysis. Indeed, the memory type attribute can be used in combination with the address attribute to provide revised transaction identifiers which are dependent both on the region of memory accessed and an indication of which type of memory is being accessed.

Additionally, if it is necessary to map the default initial transaction identifier to more than two revised IDs, the design can be extended so there are $2^N$ write response queues and $2^N$ read response queues, to provide separate response queues for each of the N ID bits.

Further, if each incoming transaction has M ID bits where M is one and above, the design can be extended so there are $2^M$ instances of each read command ID queue, write command ID queue and write ID queue, and $2^{(M+N)}$ instances of both the read response queues and the write response queues.

However, it will be appreciated that if the number of initial transaction identifiers increases and/or the number of revised transaction identifiers increases, then the proliferation in the number of queues can potentially lead to a significant area requirement for implementing the functionality of the ID expansion circuitry. In an alternative embodiment, the queue based implementation of FIG. 7 can be replaced by an implementation based on a transaction tracking table and a separate response buffering table for the write and read sides. An example implementation is shown in FIG. 8.

As with the FIG. 7 implementation, the write side module 450 again includes three sub-blocks 455, 460, 465 and the read side module 470 again includes two sub-blocks 475, 480, but in this embodiment the internal components within each of the sub-blocks changes.

Figure 8:
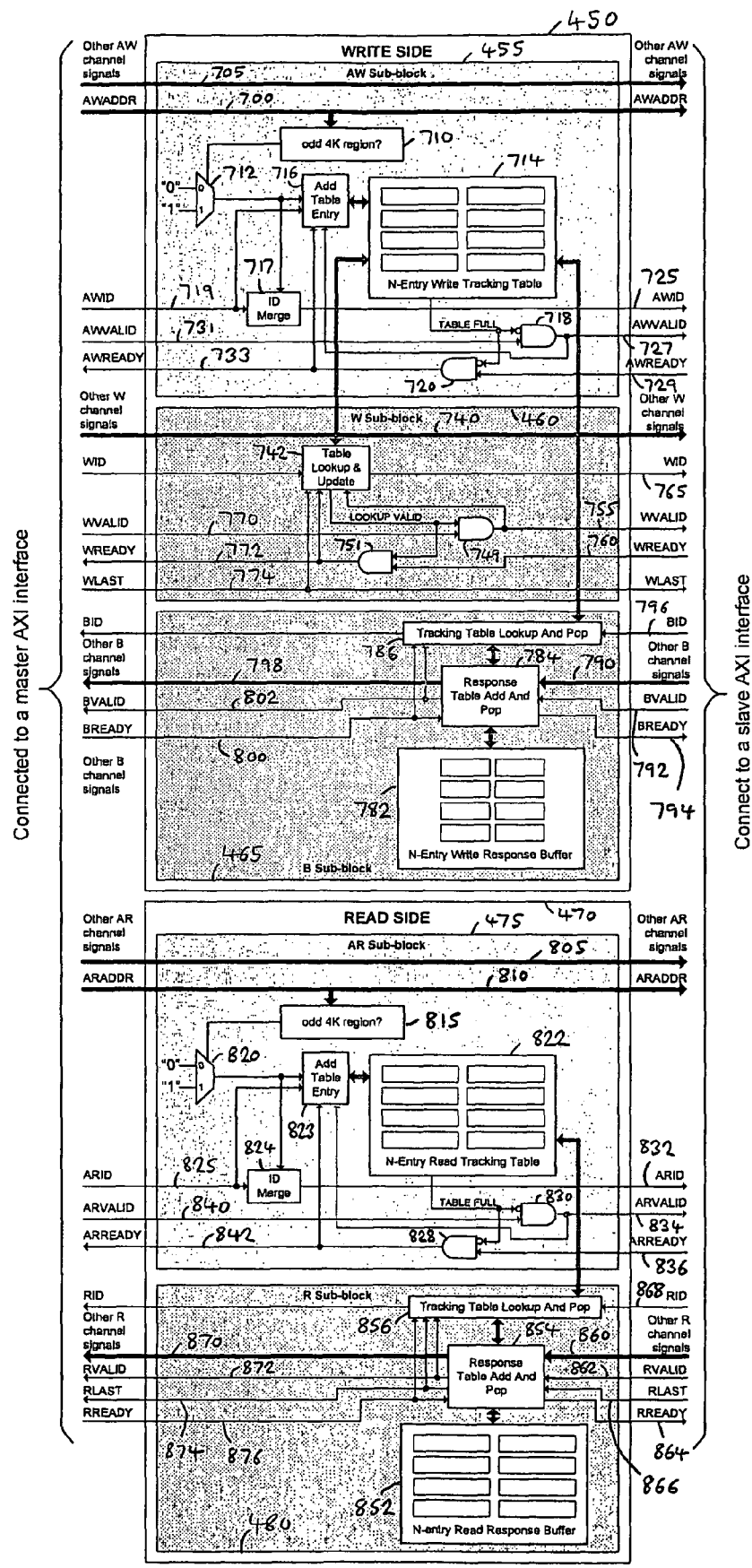
FIG. 8 provides a detailed view of the ID expansion circuitry in accordance with an alternative embodiment.

From a comparison of FIG. 8 with FIG. 7, it can be seen that the components 710, 712, 718 and 720 operate in the same way as the components 510, 512, 518 and 520 of FIG. 7, with the AND gate 718, 720 causing the add table entry circuitry 716 to stall adding an entry if the table is full. The write tracking table 714 replaces the write command ID queue 514, and ID merging circuitry 717 is provided to merge the output from the multiplexer 712 with an original transaction ID specified over path 719. Accordingly, by virtue of this merging process, a revised transaction ID is output over path 725.

Each transaction tracking table contains N number of entries, where N is the maximum number of outstanding accesses that can be issued. These are used to implement link lists, with each list tracking the status of transactions using the same incoming ID. Each entry contains the following items:
ORIGINAL_ID. This is the original ID of the transaction.
REVISED_ID. This is the revised ID of the transaction
PTR. This is used to point to another entry, which records the next transaction with the same ID
FIRST status bit. This indicates that the entry is the first in the link list, which is also the oldest.
LAST status bit. This indicates that the entry is the last in the link list, which is also the newest.
VALID bit. This indicates that the entry contains valid data.
FIRST_NWD status bit. This indicates that the entry is the first in a link list that does not have its write data sent yet. This field only exists for the Write Side Module.
WDATA_SENT status bit. This indicates that the write data for the transaction in the entry is already sent. This field only exists for the Write Side Module.

The response buffering table contains N number of entries, where N is the maximum number of outstanding accesses that can be issued. These are also used to implement link lists, with each list tracking the status of transactions and storing the data for all responses using the same REVISED ID. Each entry contains the following:
VALID status bit. This indicates that the entry contains a valid response.
FIRST status bit. This indicates that the entry is the first in the list using the same ID
LAST status bit. This indicates that the entry is the last in list using the same ID.
WRITE_RESP. This area contains the write response. This only exists for the Write Side Module.
READ_RESP. This area contains the read response. This only exists for the Read Side Module.

Searches to find valid entries can easily be performed using logical AND operations. For example, to find a valid entry that uses an ORIGINAL_ID of X, and is the first in the list, we can for each entry, perform a compare of the ORIGINAL_ID with X and then perform a logical AND of that result with VALID and FIRST. Then the entry that has a result of '1' is the search result.

Considering again the operation of the write address sub-block 455, when a transaction passes through the write address channel, a search is performed in the transaction tracking table 714 to find the entry of the last transaction that uses the same ORIGINAL_ID. An entry is then added into the table, with the following content:
ORIGINAL_REVISED_ID set accordingly to the original ID and the generated revised ID.
VALID bit set to high
LAST bit set to high
FIRST bit set to high if it is the first entry using the original ID
FIRST_NWD bit set to high if it is the first entry with the ID, or if all entries with the same ORIGINAL_ID have the WDATA_SENT status bit set.
All others fields are set to low or zeros.

In addition, if there was an older entry with the LAST bit set that uses the same ORIGINAL ID, then in that older entry, the LAST bit is cleared and the PTR is set to point to the new entry.

Considering now the write data sub-block 460, the AND gates 749, 751 operate in an analogous manner to the AND gates 549, 551 of FIG. 7, and in particular prevent propagation of asserted valid and ready signals if an invalid lookup occurs within the table lookup and update circuitry 742.

When sending a write data burst, a search is performed in the transaction tracking table 714 to find the entry with the same ORIGINAL_ID that has the FIRST_NWD set to high. The REVISED_ID from the entry is then used for the outgoing write channel. Once the write burst is sent, the entry's FIRST_NWD field is cleared and the FIRST_NWD of the entry pointed to by PTR is then set.

Considering now the write response sub-block 465, the response table add and pop circuitry 784 is used to reference the write response buffer 782. In particular, when receiving a response, a search is performed in the response buffer table to find the last entry with the same REVISED ID. An entry is then added to the table with VALID set to high, and FIRST set only to high if it is the first entry using the same REVISED ID. The LAST bit is set, and the WRITE_RESP field is updated with the actual response data. If an older entry exists with the same REVISED ID and the LAST bit set, this LAST bit is cleared and the PTR updated to point to the new entry.

A search is then performed by the tracking table lookup and pop circuitry 786 to find all ORIGINAL IDs of valid entries in the transaction tracking table 714 that also have their WDATA_SENT field set. For each ORIGINAL ID, the REVISED_ID of the oldest entry is then used to search the response buffer table to find any valid entry that uses the same REVISED ID. If there is such a valid entry, the entry is returned as the response on the B channel over path 798. These two searches can be performed over a number of cycles if needed. In parallel, to improve latency, a search can be performed using the incoming response ID as REVISED_ID in the transaction tracking table to see if any corresponding entry has the LAST bit set. If there is such an entry, then the incoming response can be immediately returned to the master. If not, two additional step can be performed, firstly using the ORIGINAL_ID from the previous search to determine if there are other REVISED_ID used with the same ORIGINAL_ID that has the LAST bit set, and then using the other REVISED_ID, to search to find if there are any entries in the response buffer using the ID, which can then be returned. For every response returned, the corresponding entries' VALID bit in the transaction tracking table and response buffer table is cleared, and the LAST bit of the entry pointed to by the PTR field is set.

Considering now the read side module 470, it can be seen from a comparison of FIG. 8 with FIG. 7 that the components 815, 820, 828, 830 correspond to the elements 615, 620, 628, 630 of FIG. 7. The components 822, 823, 824 operate in a similar way to the components 714, 716, 717 in the write address sub-block 455. Hence, when a transaction passes through the read address channel, a search is performed in the transaction tracking table 822 to find the entry of the last transaction that uses the same ORIGINAL_ID. An entry is then added into the table, with the following content:
ORIGINAL_ID, REVISED_ID set accordingly to the original ID and the generated revised ID.
VALID bit set to high
LAST bit set to high
FIRST bit set to high if it is the first entry using the original ID All others fields are set to low or zeros.

In addition, if there was an older entry with the LAST bit set that uses the same ORIGINAL ID, then in that older entry the LAST bit is cleared and the PTR is set to point to the new entry.

The read data sub-block 480 operates in a similar way to the write response sub-block 465, and hence the components 852, 854, 856 correspond generally with the components 782, 784, 786. When receiving a response, a search is performed in the response buffer table to find the last entry with the same REVISED ID. An entry is then added to the table with VALID set to high, and FIRST set only to high if it is the first entry using the same ID. The LAST bit is set, and the READ_RESP field is updated with the actual response data. If an older entry exists with the same REVISED ID and the LAST bit set, this LAST bit for the older entry is cleared and its PTR updated to point to the new entry.

In a similar way to the write response side block, running in parallel, searches are performed to find all valid entries that also have returned data so that they can be returned to the master. The reader is referred to the earlier description of the B sub-block 465 for details.

As will be appreciated from the above described embodiments, such embodiments provide a mechanism for expanding each initial transaction identifier specified in association with a transaction from a master device to one of a plurality of revised transaction identifiers based on comparing at least one attribute of the transaction with predetermined attributes indicative of the target slave device for the transaction. This allows the number of revised transaction identifiers generated to be constrained to a relatively small number, whilst allowing the performance of certain overlapped transactions to be maintained by avoiding the need for deadlock avoidance schemes to intervene in those overlapped transactions. In one particular embodiment, a high performance master device is arranged to access SDRAM memory, where the SDRAM memory is actually arranged as a plurality of SDRAM memory devices arranged in an striped arrangement. Hence, when the master device issues a sequence of transactions to the SDRAM memory with a common initial transaction identifier, individual transactions in the sequence will actually map to different SDRAM devices, thus potentially giving rise to a deadlock issue due to a single master device accessing multiple slave devices with the same transaction ID. Normally, deadlock avoidance control circuitry within the interconnect would detect such conditions and in effect serialise the offending transactions to avoid the possibility of deadlock. However, this would significantly impact the performance of the master device. However, by using the ID expansion circuitry of the above described embodiments in association with the master device, such situations can be detected prior to the transactions being forwarded on to the interconnect, with revised transaction identifiers being allocated to individual transactions so that any transactions to one SDRAM device use different revised transaction identifiers to the revised transaction identifiers used for transactions accessing one of the other SDRAM devices. Hence, the use of the ID expansion circuitry 70 enables the performance of the high performance master to be maintained whilst ensuring the sequence of transactions are "deadlock safe", hence avoiding the need for the deadlock avoidance circuitry within the interconnect to intervene in the processing of those transactions.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. Transaction identifier expansion circuitry for interfacing between a master device and interconnect circuitry used to couple said master device with a plurality of slave devices to enable transactions to be performed, each transaction comprising an address transfer from said master device to a target slave device within said plurality of slave devices, and one or more data transfers between said master device and said target slave device, at least one data transfer being a response transfer from said target slave device to said master device, each transaction having a transaction identifier associated therewith and the interconnect circuitry handling in order transactions having the same transaction identifier, the master device being configured to initiate a sequence of transactions and the transaction identifier expansion circuitry comprising:

transaction analysis circuitry, responsive to each transaction in said sequence, to compare at least one attribute of the transaction with predetermined attributes indicative of the target slave device for said transaction, and to map an initial transaction identifier for the transaction to one of a plurality of revised transaction identifiers dependent on the comparison, such that the revised transaction identifier is dependent on the target slave device; and reordering circuitry having buffer circuitry for buffering response transfers received from the interconnect circuitry destined for said master device, each response transfer having the revised transaction identifier associated therewith, the reordering circuitry being configured to reorder the response transfers having regard to the original transaction order of those transactions within said sequence of transactions that had the same initial transaction identifier, prior to provision of each response transfer to said master device, wherein said at least one attribute of the transaction compared by the transaction analysis circuitry comprises an address specified by the address transfer of the transaction, wherein:

at least two slave devices from said plurality of slave devices are memory devices, each memory device providing a plurality of pages of memory, and the transaction analysis circuitry is configured to compare said address with predetermined page attributes, and to map said initial transaction identifier to one of said plurality of revised transaction identifiers dependent on the comparison;

whereby for transactions within said sequence that have the same initial transaction identifier but access different ones of said at least two slave devices, the transaction analysis circuitry will map the initial transaction identifier to different revised transaction identifiers.

2. Transaction identifier expansion circuitry as claimed in claim 1, wherein a first of said memory devices provides a plurality of even pages of memory and a second of said memory devices provides a plurality of odd pages of memory, and the transaction analysis circuitry is configured to determine from said address whether one of said even pages or one of said odd pages is being accessed by the transaction, thereby causing the revised transaction identifier allocated when the first of said memory devices is the target slave device to be different to the revised transaction identifier allocated when the second of said memory devices is the target slave device.

3. Transaction identifier expansion circuitry as claimed in claim 1, wherein the transaction analysis circuitry is configured to determine whether any of said at least two slave devices is the target slave device for the transaction, and if not is configured to map the initial transaction identifier to a revised transaction identifier not used when any of said at least two slave devices is the target slave device.

4. Transaction identifier expansion circuitry as claimed in claim 1, wherein said at least two of said slave devices are SDRAM memory devices.

5. Transaction identifier expansions circuitry as claimed in claim 4, wherein first and second SDRAM memory devices are provided which are configured in a striped arrangement so that even pages of memory are provided by the first SDRAM memory device and odd pages of memory are provided by the second SDRAM memory device.

6. Transaction identifier expansion circuitry as claimed in claim 1, wherein the master device is arranged to provide the same initial transaction identifier for all transactions in the sequence.

7. Transaction identifier expansion circuitry as claimed in claim 1, wherein:
said buffer circuitry comprises a plurality of response queues, each response queue being associated with one of said revised transaction identifiers and being arranged to buffer each response transfer received from the interconnect circuitry with that associated revised transaction identifier;
the reordering circuitry further comprising an identifier queue to record which revised transaction identifier has been associated with each pending transaction, and being configured to reference the identifier queue in order to determine the order in which the response transfers should be output to said master device from the plurality of response queues.

8. Transaction identifier expansion circuitry as claimed in claim 1, wherein:
said buffer circuitry comprises a tracking table having a plurality of entries sufficient to provide an entry for each pending transaction, each entry being populated for a pending transaction to identify the revised transaction identifier for that pending transaction and each response transfer of that transaction, the buffer circuitry further maintaining sequencing information identifying a relative ordering between multiple entries relating to pending transactions having the same initial transaction identifier;
the reordering circuitry being configured to reference the sequencing information in order to determine the order in which the response transfers should be output to said master device from the tracking table.

9. Transaction identifier expansion circuitry as claimed in claim 8, wherein the sequencing information is maintained as at least one linked list, a separate linked list being provided for each initial transaction identifier.

10. Transaction identifier expansion circuitry as claimed in claim 1, wherein said at least one attribute of the transaction compared by the transaction analysis circuitry comprises a memory type identified by the transaction.

11. Transaction identifier expansion circuitry as claimed in claim 1, wherein the interconnect circuitry comprising a plurality of connection paths configured to provide at least one address channel for carrying said address transfers and at least one data channel for carrying said data transfers.

12. A data processing apparatus comprising:
a plurality of master devices;
a plurality of slave devices;
interconnect circuitry for coupling said master devices with said slave devices to enable transactions to be performed; and
at least one transaction identifier circuitry as claimed in claim 1, each transaction identifier circuitry being configured to interface between an associated one of said plurality of master devices and said interconnect circuitry.

13. A method of operating transaction identifier expansion circuitry to interface between a master device and interconnect circuitry used to couple said master device with a plurality of slave devices to enable transactions to be performed, each transaction comprising an address transfer from said master device to a target slave device within said plurality of slave devices, and one or more data transfers between said master device and said target slave device, at least one data transfer being a response transfer from said target slave device to said master device, each transaction having a transaction identifier associated therewith and the interconnect circuitry handling in order transactions having the same transaction identifier, the master device being configured to initiate a sequence of transactions, and the method comprising:
responsive to each transaction in said sequence, comparing at least one attribute of the transaction with predetermined attributes indicative of the target slave device for said transaction;
mapping an initial transaction identifier for the transaction to one of a plurality of revised transaction identifiers dependent on the comparison, such that the revised transaction identifier is dependent on the target slave device;
buffering response transfers received from the interconnect circuitry destined for said master device, each response transfer having the revised transaction identifier associated therewith; and
reordering the response transfers having regard to the original transaction order of those transactions within said sequence of transactions that had the same initial transaction identifier, prior to provision of each response transfer to said master device, wherein said at least one attribute of the transaction compared during said comparing step comprises an address specified by the address transfer of the transaction; and
wherein at least two slave devices from said plurality of slave devices are memory devices, each memory device providing a plurality of pages of memory, said comparing step compares said address with predetermined page attributes, and said mapping step maps said initial transaction identifier to one of said plurality of revised transaction identifiers dependent on the comparison;
whereby for transactions within said sequence that have the same initial transaction identifier but access different ones of said at least two slave devices, said mapping step will map the initial transaction identifier to different revised transaction identifiers.

14. A transaction identifier expander for interfacing between a master means and interconnect means used to couple said master means with a plurality of slave means to enable transactions to be performed, each transaction comprising an address transfer from said master means to a target slave means within said plurality of slave means, and one or more data transfers between said master means and said target slave means, at least one data transfer being a response transfer from said target slave means to said master means, each transaction having a transaction identifier associated therewith and the interconnect means for handling in order transactions having the same transaction identifier, the master means for initiating a sequence of transactions and the transaction identifier expander comprising:

transaction analysis means, responsive to each transaction in said sequence, for comparing at least one attribute of the transaction with predetermined attributes indicative of the target slave means for said transaction, and to map an initial transaction identifier means for the transaction to one of a plurality of revised transaction identifier means dependent on the comparison, such that the revised transaction identifier means is dependent on the target slave means; and reordering means having buffer means for buffering response transfers received from the interconnect means destined for said master means, each response transfer having the revised transaction identifier means associated therewith, the reordering means for reordering the response transfers having regard to the original transaction order of those transactions within said sequence of transactions that had the same initial transaction identifier means, prior to provision of each response transfer to said master means, wherein said at least one attribute of the transaction compared by the transaction analysis means comprises an address specified by the address transfer of the transaction; and wherein at least two slave means from said plurality of slave means are memory device means, each memory device means providing a plurality of pages of memory, and the transaction analysis means is configured to compare said address with predetermined page attributes, and to map said initial transaction identifier means to one of said plurality of revised transaction identifier means dependent on the comparison;

whereby for transactions within said sequence that have the same initial transaction identifier means but access different ones of said at least two slave means, the transaction analysis means will map the initial transaction identifier means to different revised transaction identifier means.

\* \* \* \* \*